United States Patent [19]

Sharpe

[11] Patent Number: 4,975,004
[45] Date of Patent: Dec. 4, 1990

[54] HOT LINE ATTACHMENT

[76] Inventor: Robert F. Sharpe, 2141 Fort Rice St., Petersburg, Va. 23805

[21] Appl. No.: 433,901

[22] Filed: Nov. 9, 1989

[51] Int. Cl.⁵ .............................................. B23B 45/00
[52] U.S. Cl. ................................... 408/238; 279/1 A; 408/710
[58] Field of Search .................... 408/238, 241 R, 710, 408/1 R, 239 R, 239 A, 240; 279/1 R, 1 A, 1 ME, 1 Q; 409/134; 310/50

[56] References Cited

U.S. PATENT DOCUMENTS 3,685,843 8/1972 Jacyno ............................ 408/710 X
3,797,960 3/1974 McCarthy ....................... 408/710 X
3,910,589 10/1975 Derbyshire ..................... 279/1 Q X Primary Examiner—Steven C. Bishop
Attorney, Agent, or Firm—Cushman, Darby & Cushman

[57] ABSTRACT

An apparatus for drilling into energized utility components without having to first de-energize them so as to allow continuous service to consumers is provided. The apparatus includes a drive shaft constructed of an insulating material terminating in a drill chuck and drill bit. The drive shaft is supported by an adjacent rod using pillar block bearing assemblies which allow the uninhibited rotation of the drive shaft. This attachment can be powered by a variety of power units.

11 Claims, 2 Drawing Sheets

HOT LINE ATTACHMENT

BACKGROUND OF THE INVENTION

1. Field of the Invention

This invention relates to insulated drilling apparatuses for drilling holes in electric power equipment while the electrical system remains energized. More particularly, the present invention relates to an insulated attachment for a power device which allows the drilling of holes into energized power line equipment without turning off power.

2. Description of the Related Art

With the increased demand for electricity, whether it be in the summer to run air-conditioners or in the winter to power heaters, there is a corresponding increased demand for repairs on transmission lines, transformers, and other electrical distribution equipment. The increased demand requires more efficient methods for performing repairs to damaged equipment in the field so that power does not have to be shut off while repairs are in progress or to significantly decrease the time required to perform needed repairs.

Previously, to drill into any energized transmission component or into portions of energized equipment, the power to that particular component or equipment had to be shut off to assure that the person servicing the device would not be injured. The alternative was that the repair would not be made timely.

Since many types of repairs would not warrant, by themselves, the shutting off of power, it became necessary to develop apparatuses for working on energized equipment.

SUMMARY OF THE INVENTION

The present invention provides a solution to the problem of performing work on energized power equipment without interrupting service to customers, making that service more efficient. To achieve the foregoing object, the present invention provides a hot line attachment for power equipment such as an electric drill. The apparatus is insulated in a unique manner that eliminates the risk of electrocution of the operator regardless of dress. The attachment is portable and can be moved from trouble spot to trouble spot and easily carried by repairmen.

The apparatus can be attached to a wide variety of powering means other than electric drills, and such powering means could run on a variety of power sources or fuels including an air tool supplied by nitrogen or a drill run by a gasoline engine.

Other objects, features, and characteristics of the present invention, as well as the methods of operation and functions of the related elements of the structure, and the combination of parts and economics of manufacture, will become apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENT

Figure 1:
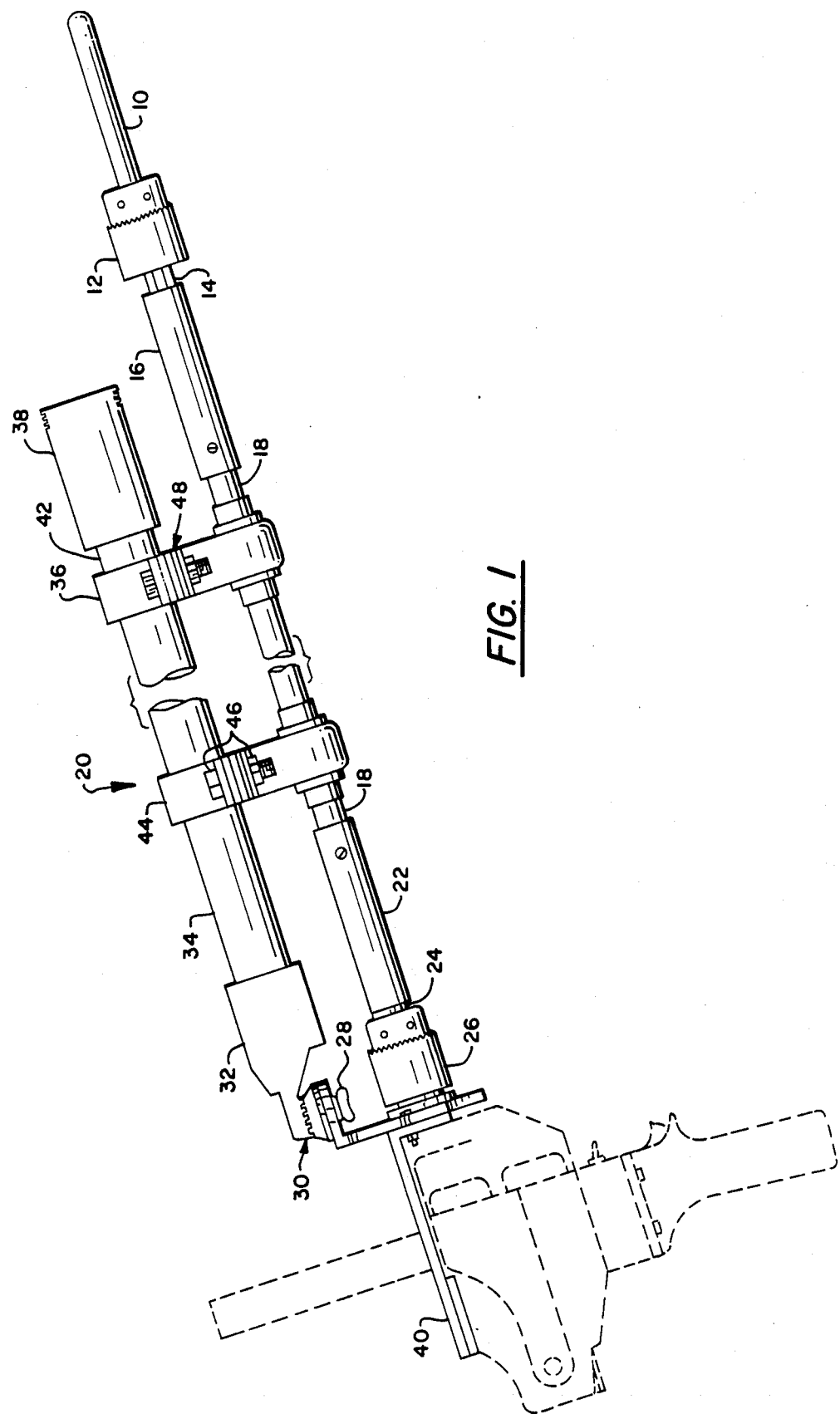
FIG. 1 is a side view of the preferred embodiment, showing the attachment powered by an electric drill.

As shown in FIG. 1, the apparatus according to the present invention is generally shown at 5 and is comprised of a fiberglass rod 18, a supporting rod 34, two pillarblock assemblies 36 and 20, and a means to mount the present invention to a powering means. This apparatus cooperates to provide a connection mechanism, for example, allowing the drilling of holes in energized components of power distribution equipment.

The present invention has a drill bit 10 which can be changed and mounted in a drill chuck 12. The drill chuck 12 is attached to a hex-shaped steel rod 14 that attaches to a ¾ inch outer diameter fiberglass rod 18. The joint between the steel rod 14 and the fiberglass rod 18 is covered with a metallic sleeve 16 serving both to protect and reinforce that joint.

The fiberglass rod 18 extends through a pillar block bearing assembly 36 and runs unobstructed for about fifty inches to a second pillar block bearing assembly 20. The pillar block bearing assemblies 36, 20 assist in the support of the fiberglass rod 18 and allow that rod 18 to turn freely in bearing assemblies 36A and 20A respectively. The fiberglass rod 18 further extends to another hex-shaped steel rod 24, and the joint therebetween is also covered with a metallic sleeve 22. Rod 24 is attached to a second drill chuck 26 which is positively driven, the preferred embodiment being an electric drill. A wing nut 28 secures the upper section of the present invention to mounting plates 40, 60 that provide a means by which the present invention is secured to a power means and an insulated holder (not numbered). Mounting plate 60 is secured to plate 40 by two bolts, one shown at 64. The connection 30 serves as a joint to hold the supporting rod to mounting plate 60 so that the supporting rod does not turn or twist. Wingnut 28 holds mounting plate 60 firmly to metallic end fitting 32.

Figure 2:
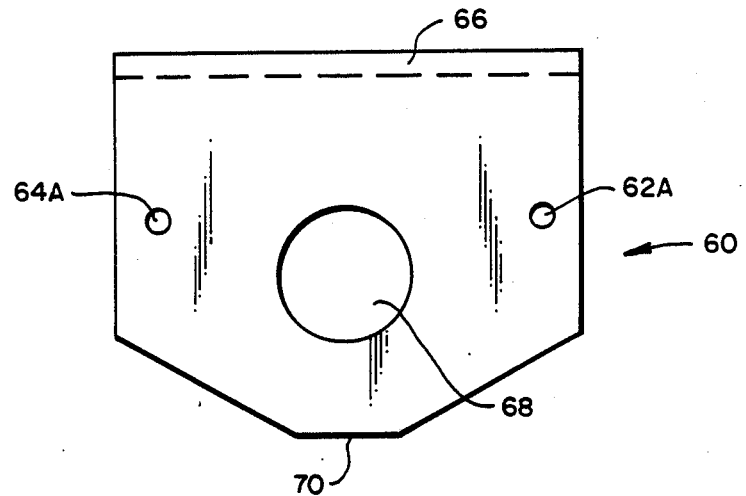
FIG. 2 is a front view of a plate which serves as an interface between the powering means and the drill attachment.

FIG. 2 depicts mounting plate 60 which serves as an attachment for the apparatus to the powering means. The top of mounting plate 60 has an extension 66 which connects to the upper section of the present invention. Two bolts pass through holes 64A and 62A respectively and secure mounting plate 60 to mounting plate 40. Both plates are approximately ¼ inch thick. The invention attaches to the powering means through hole 68 in plate 60 and a corresponding hole in plate 40. Plate 60 is about 1½ inches across the lower flat section 70. The plate 60 is about 4 inches high and 6182 inches across the top.

As is further shown in FIG. 1, the upper section, which is comprised of supporting rod 34, serves to support the lower section, comprised of rod 18 and the attachments connected thereto, that actually is responsible for the drilling. The upper section begins with a metallic end fitting 32 holding a 1½ inch outer diameter fiberglass rod 34, the supporting rod, in place. The fiberglass rod 34 is secured at both pillar block bearing assemblies 20 and 36 by rubber collars 44 and 42 respectively that are held tight by clamping bolts 46 and 48 respectively. The large fiberglass rod 34 terminates in a metallic end fitting 38.

Figure 3:
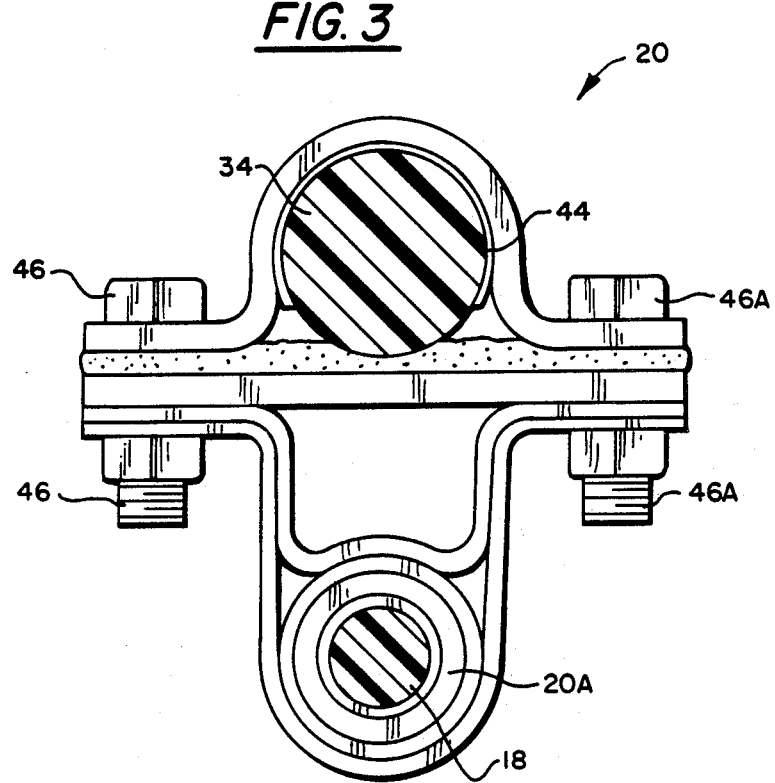
FIG. 3 is a cross-sectional view showing a pillar block bearing assembly taken along lines 3—3 in FIG. 1.

FIG. 3 is a view of pillar block bearing assembly 20, which is identical to 36. Bolts 46 and 46A hold the large fiberglass rod 34 and the lower fiberglass rod in place. Bearing assembly 20A allows fiberglass rod 18 to turn freely. Rubber collar 44 firmly grips the large fiberglass rod 34 so that it will not move. In the preferred embodiment, the pillar block assembly is made of structural aluminum.

The speed of the drill bit 10 is controllable by the power means. The drill chuck 12 opens like a conventional drill chuck for switching bits.

Excluding the power means, the preferred embodiment of the present invention measures at least six feet from end to end, but this dimension is not a requirement for the invention, since for higher voltages the length is greater.

To operate the invention, the power means is energized and the motor that is responsible for turning the apparatus is engaged, thereby turning the drill chuck 26. The drill chuck 26 rotates, thus turning the hex-shaped steel rod 24 and the small fiberglass rod 18. The pillar block bearing assemblies 20 and 36 support the turning fiberglass rod 18 and allow it to turn without any hindrance. The turning fiberglass rod 18 turns the hex shaped steel rod 14 thereby turning the drill chuck 12. The drill bit 10 is inserted in the drill chuck 12 and turns accordingly.

Although long in size, the apparatus is portable since so much of it can be constructed of a light weight material such as fiberglass rather than heavier materials like steel. The weight is such that the device is manageable for utility workers.

While the present invention has been described in connection with what is currently regarded as the most practical and preferred embodiment, it is to be understood that the present invention is not to be limited to the disclosed embodiment, rather the invention is meant to cover various modifications and equivalent arrangements included within the scope of the appended claims.

For example, using a power supply that runs on nitrogen or gasoline would eliminate the need to run an extension cord through the transmission lines for supplying power to the power means. Furthermore, the particular materials utilized for forming various portions of the device can be selected depending upon the particular properties and functions desired or required. Also, the invention could perform other functions besides drilling. The invention could be adapted to saw into energized components or to screw bolts into components. Therefore, persons of ordinary skill in the art are to understand that all such equivalent structures are to be included within the scope of the following claims.

What is claimed is:

1. An attachment for an apparatus for drilling into energized utility components comprising:
   an insulated drive shaft having a drilling end, a second end and a longitudinal axis;
   means for operatively connecting the second end of said insulated drive shaft to a drive device;
   an insulated rod having a first end, a second end and a longitudinal axis;
   attaching means for attaching one end of said insulated rod to the drive device;
   at least one connection member extending between said insulated rod and said insulated drive shaft to rotatably support said insulated drive shaft below and parallel to said insulated rod; and
   a drill chuck operatively coupled to the drilling end of said drive shaft.

2. An apparatus as claimed in claim 1, further comprising a first hex-shaped steel rod joined to the second end of said drive shaft and coupled with said drive device.

3. An apparatus as claimed in claim 2, further comprising a metallic sleeve for protecting and reinforcing a joint between said first steel rod and said drive shaft.

4. Apparatus as in claim 3 further comprising a second hex-shaped steel rod joined to the drilling end of said drive shaft, said second steel rod being coupled to said drill chuck.

5. Apparatus as in claim 4, further comprising a second metallic sleeve reinforcing and supporting a joint formed between the second steel rod and said drive shaft.

6. Apparatus as claimed in claim 1 wherein said drive shaft is made of fiberglass.

7. Apparatus as claimed in claim 1 wherein said at least one connection member includes:
   means for fixedly holding the insulated rod; and
   means for rotatably holding said drive shaft.

8. Apparatus as claimed in claim 7, wherein said rotatably holding means hole includes a bearing assembly providing unrestricted rotation of said drive shaft.

9. Apparatus as claimed in claim 7, wherein said fixedly holding means secures said insulated rod using a rubber collar.

10. Apparatus as claimed in claim 1, having a length of about seven feet.

11. Apparatus as claimed in claim 1, in combination with a drive device.

* * * * *